United States Patent

[11] 3,633,628

[72] Inventors William F. Duquette
Bloomfield Hills;
Dale T. Stormzand, Rochester; Warren C. Rauhauser, Detroit, all of Mich.
[21] Appl. No. 319
[22] Filed Jan. 2, 1970
[45] Patented Jan. 11, 1972
[73] Assignee Avis Industrial Corporation
Madison Heights, Mich.

[54] WIREWAY DIVIDER
7 Claims, 8 Drawing Figs.
[52] U.S. Cl. ............................................. 138/116, 174/68 C, 174/101
[51] Int. Cl. .................................................. H02g 7/12
[50] Field of Search ........................................ 138/111, 115, 116, 117, 92, 159, 163; 174/68 C, 101; 220/3.7, 22.1, 22.2, 22.3

[56] References Cited
UNITED STATES PATENTS

| | | | |
|---|---|---|---|
| 1,590,569 | 6/1926 | Fisk ............................... | 174/68 C UX |
| 2,709,454 | 5/1955 | Coulters ........................ | 138/116 |
| 3,329,763 | 7/1967 | D'Esopo ........................ | 138/116 X |
| 3,403,220 | 9/1968 | Riedel et al. ................. | 174/101 |
| 3,471,629 | 10/1969 | O'Leary ........................ | 138/115 X |

FOREIGN PATENTS

| | | | |
|---|---|---|---|
| 881,995 | 11/1961 | Great Britain ............... | 138/116 |
| 1,131,125 | 10/1968 | Great Britain ............... | 174/68 C |

Primary Examiner—Edward J. Earls
Attorney—Harness, Dickey & Pierce

ABSTRACT: An electrical wireway comprising a plurality of channel shaped wireway sections connected end-to-end by overlapping generally U-shaped members and adapted to be divided longitudinally by one or more removable partitions which are detachably interconnected with each other and at least certain of which are provided with attaching members which extend under and are retained by overlapping portions of the U-shaped connecting members.

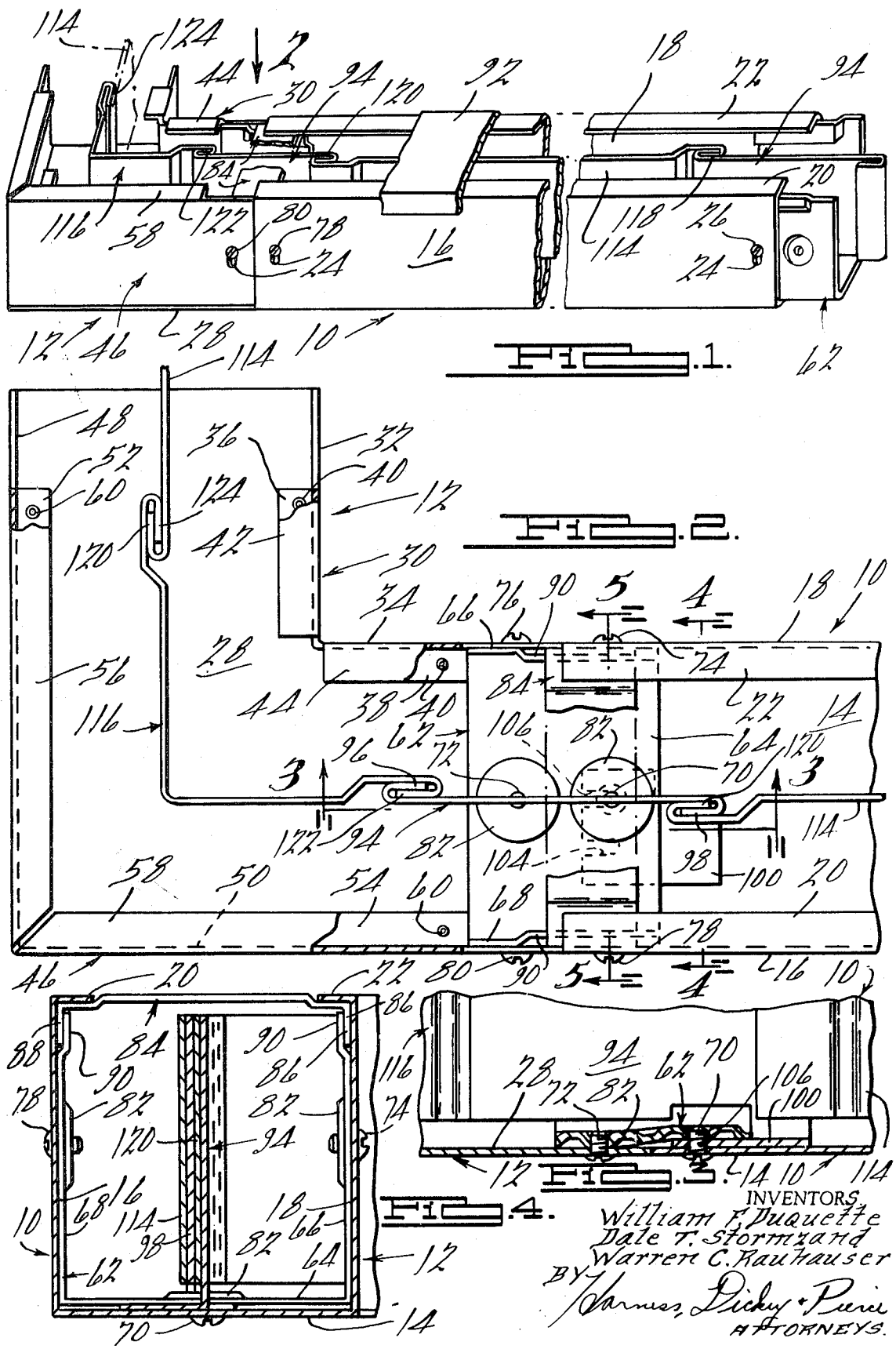

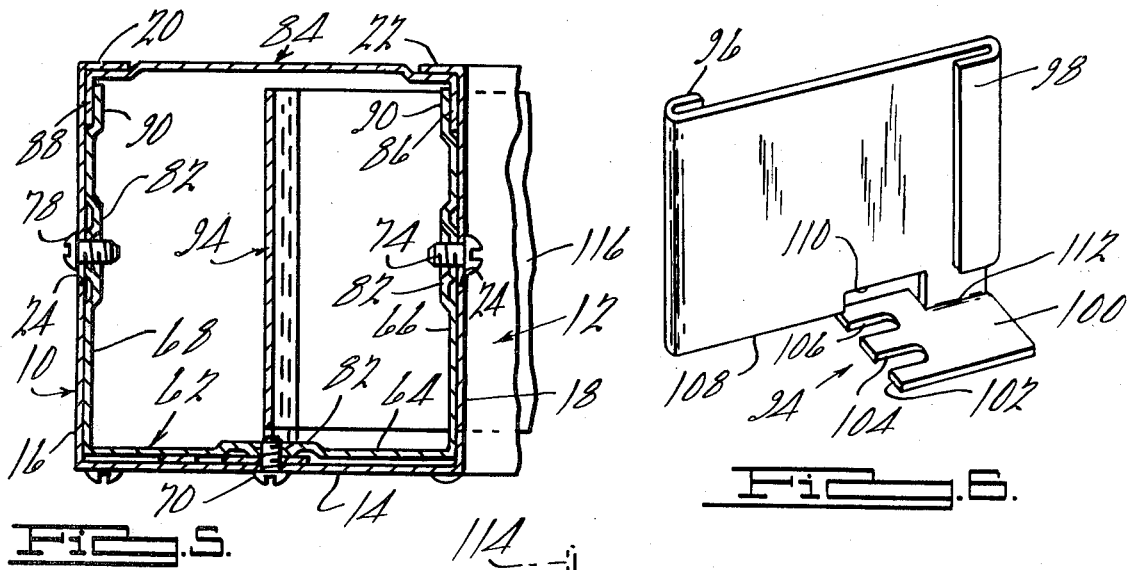
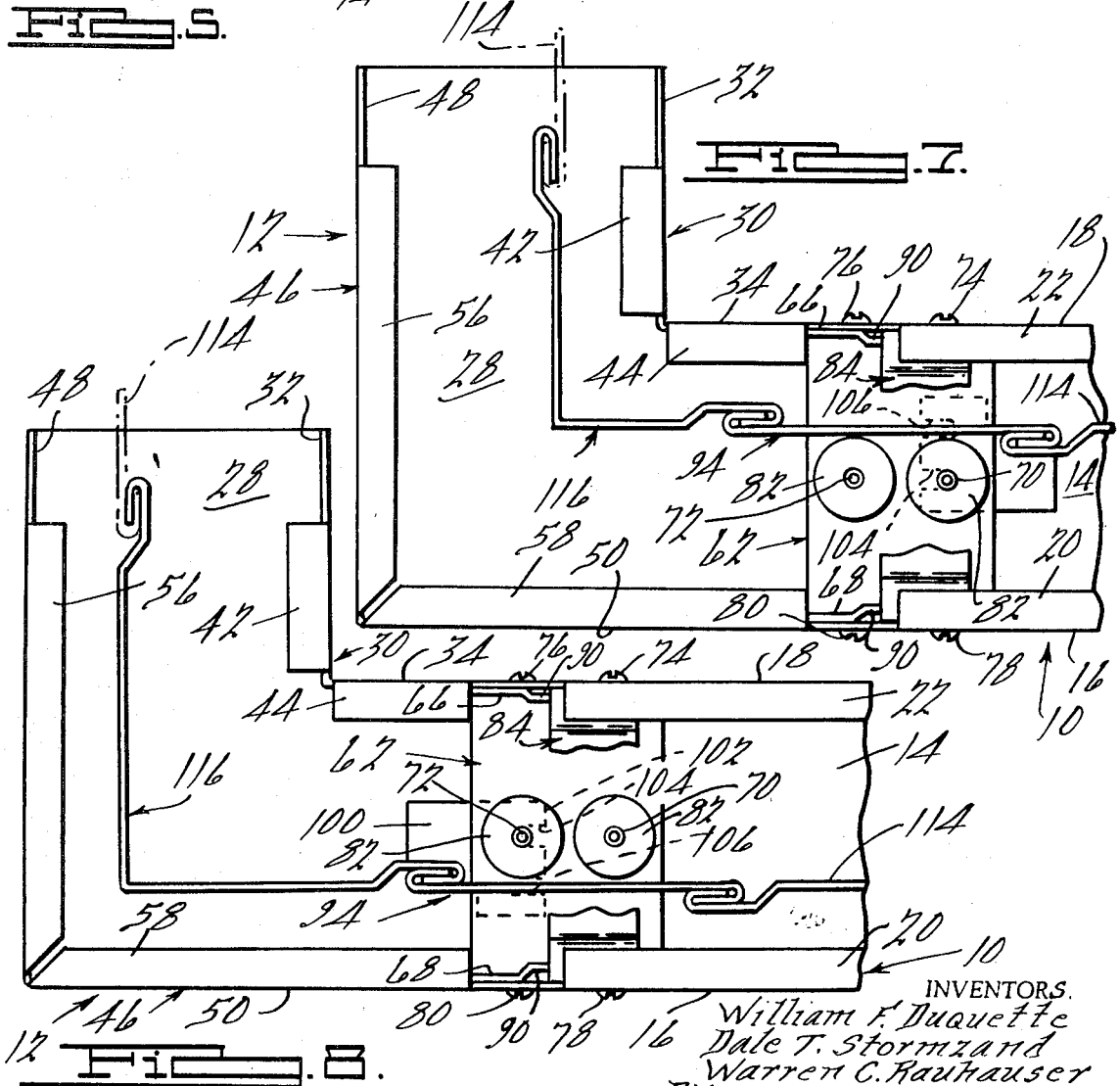

WIREWAY DIVIDER

BACKGROUND OF THE INVENTION

Electrical wiring of industrial plants and equipment frequently is contained in metal raceways or wireways which protect the wiring and the associated connectors and other parts from physical abuse and also relatively free from dirt, grease, lubricant and coolant liquids, and other contaminants to which they otherwise would be exposed. However, proper installation practice requires, and indeed the National Electrical Code demands, that power circuits, signaling and communication circuits, light circuits, control circuits and the like be electrically separated and physically isolated from each other. This, in turn, requires the installation of separate raceways for each kind of circuit. Manifestly, this necessity very substantially increases the cost of installation; and, where space is at a premium, as in the case of power and control circuits for machine tools and the like, for example, it also greatly complicates the job of installation.

SUMMARY OF THE INVENTION

The basic wireway of this invention has the same capacity and can be used in the same manner as conventional wireways; however, it is uniquely constructed so that partitions can be readily installed either at the time of the original installation or at some later date to accommodate separate circuits which must be isolated from each other. Furthermore, the partition or partitions can be placed in different positions in the wireway so as to provide separate compartments of equal size or of different sizes depending on the existencies of the particular situation. The fact that the partitions can be easily and quickly installed either at the time of the original installation or some subsequent time greatly enhances the utility and versatility of the wireway and makes it readily adaptable to changes in conditions or in the requirements imposed on it. It is significant also that the partitions are mounted in such a way that the top or front of the wireway is left open so that the wiring can be easily installed simply by placing it in the compartment at one side or the other of the partitions and without necessity of fishing the wire lengthwise through the wireway sections as sometimes is required.

DESCRIPTION OF THE DRAWINGS

In the drawing:

FIG. 1 is a prospective view showing two sections of wireway equipped with a partition or divider embodying the present invention, the partition being disposed in the middle of the wireway to divide the latter into two substantially equal compartments;

FIG. 2 is an enlarged, fragmentary, top plan view, looking in the direction of the arrow 2 in FIG. 1, of a portion of the wireway shown in FIG. 1;

FIG. 3 is a fragmentary, longitudinal sectional view taken on the line 3—3 of FIG. 2;

FIG. 4 is a transverse sectional view taken on the line 4—4 of FIG. 2;

FIG. 5 is a transverse sectional view taken on the line 5—5 of FIG. 2;

FIG. 6 is a perspective view of a partition member which forms a part of the invention;

FIG. 7 is a fragmentary plan view similar to FIG. 2, but showing the partition positioned adjacent to the inner side of the wireway so as to divide the latter into a relatively narrow inner compartment and a relatively wide outer compartment; and FIG. 8 is a fragmentary top plan view similar to FIG. 2, but showing the partition positioned adjacent to the outer side of the wireway so as to divide the latter into a relatively narrow outer compartment and a relatively wide inner compartment.

DESCRIPTION OF THE PREFERRED EMBODIMENT

As suggested, the wireway of this invention comprises a plurality of generally channel shaped main body sections which are fastened together in endwise butting relation. Certain of these sections are of straight channel shape, as shown at 10 in FIG. 1, and other of the sections are corner sections of the type shown at 12. The straight channel sections 10 can be of any desired length. It is conventional practice to provide wireway sections of the type shown which are as long as ten feet; and it is the usual practice also to provide stock sizes which are progressively shorter in length so that, by judicious selection of different length sections, the wireway can be adapted within reasonable limits, to any desired length. Thus, any desired number of the straight wireway sections 10 can be connected together end-to-end in a manner that will be readily apparent; and corner sections 12 can be inserted between selected straight sections 10, as required and in the manner shown in FIG. 1, where the wireway installation is required to make a right angle turn.

More particularly, the straight wireway sections 10 preferably are made of sheet metal formed into a generally channel shape and preferably substantially square in cross section, as shown in FIG. 4. Thus, each straight section 10 has a flat bottom 14 integrally joined to spaced sidewalls 16 and 18. At the upper edges of the sidewalls 16 and 18 are inturned integral flanges 20 and 22. Both ends of the section 10 are open and the sidewalls 16 and 18 are provided adjacent to the ends thereof with vertically elongate slots 24 which accommodate screws used to fasten the channel section in the wireway assembly.

Each of the corner sections 12 is provided with a flat, generally L-shaped bottom member 28. A vertical inner wall member 30 has right angularly disposed wall portions 32 and 34 formed with inturned lower flanges 36 and 38 (FIG. 2) which overlay the bottom 28 at the inner side thereof and are fastened thereto in any suitable manner, as by the screws 40. In the particular form of the invention shown, the wall portions 32 and 34 extend upwardly flush with the inner edge of the bottom member 28 and the fastening screws 40 extend upwardly through the bottom 28 and into the sidewall flanges 36 and 38. The sidewall members 32 and 34 are formed also with inturned flanges 42 and 44 respectively at the upper edges thereof. At the outer side of the bottom member 28 is an outer wall member 46 having right angularly disposed wall portions 48 and 50 which are provided with inturned lower flanges 52 and 54, respectively, and inturned upper flanges 56 and 58, respectively. The lower flanges 52 and 54 overlay the bottom member 28 at the outer side thereof with the vertical wall portions 48 and 50 extending flush with the edges of the bottom member; and fastening screws 60 extend upwardly through the bottom member 28 and into the lower flanges 52 and 54 to fasten the outer wall member 46 securely to the bottom member 28. The ends of the corner section 12 are open and each end is adapted to butt against the end of an adjacent channel section which may be either a straight channel section as shown in the drawing or another corner channel section, all of the channel sections 10 and 12 are identical in cross-sectional size and shape so that the ends coincide when butted together.

Adjacent wireway body sections are joined by U-shaped connecting members 62 which fit snugly inside the butted end portions of the adjacent sections. In the case of the straight channel section 10 and the corner channel section 12 shown in the drawing, the connecting member 62 is disposed with the bottom 64 thereof in flat superimposed relation to the bottoms 14 and 28, respectively, of the channel sections and the sides 66 and 68 thereof in flat superimposed engagement with the inner and outer sidewalls of the channel sections. As shown, the connecting member 62 is made of sheet metal and it is of sufficient width to overlap the butted terminal portions of the channel members 10 and 12 by a substantial amount. Fastening screws 70 and 72 extend upwardly through the bottoms 14 and 28 of the two wireway sections 10 and 12 and into the bottom 64 of the connecting member 62. Similarly, fastening screws 74 and 76 extend inwardly through the sidewalls 18 and 34 of the two body sections 10 and 12 and into the inner side 66 of the connecting member 62. Other fastening screws 78 and 80 extend inwardly through the outer sidewalls 16 and 50 of the body members 10 and 12 and into the outer side 68 of the connecting member 62. If desired, the connecting member 62 can be formed with inward embossments 82 around the openings which received the screws 70–80 so that all of the screw fastenings can be pulled up tight.

In order to prevent the sidewalls of the channel members 10 and 12 from flexing and bending either inwardly or outwardly and to hold them rigidly in uniformly spaced relation, a bridging strap 84 is mounted transversely across the open tops of the channel members at each of the connecting members 62. In fact, each strap 84 extends transversely across two channel members, such as the ones here shown at 10 and 12, at the butted ends thereof. Downturned flanges 86 and 88 provided at the ends of the strap 84 extend between and are confined by the sides of the channel members 10 and 12 and inwardly offset end portions 90 of the cooperating connecting member sidewalls 66 and 68 (FIG. 4). In the form of the invention shown, the end portions of the strap 84 underlie the top flanges 20 and 22 of the straight channel section 10; and, in this connection, it will be observed (FIG. 2) that the flanges 20 and 22 extend to the end of the section 10. The adjacent top flanges 44 and 58 of the corner section 12 on the other hand, are cut back from the end of the section, as best shown in FIGS. 1 and 2, to facilitate assembly of the section and the connecting and related parts. In any event, however, the entrapment of the end flanges 86 and 88 in the manner shown together with the overlying flanges 20 and 22 hold the strap 84 securely in place. The portions of the strap 84 extending between the top flanges 20 and 22 preferably is upwardly offset, as shown in FIG, 4, a distance approximately equal to the thickness of the flanges so that the two flanges and the intermediate portion of the strap extend substantially flush with each other.

The top of the wireway is closed by a cover 92, a fragmentary portion of which is shown in FIG. 1. The cover 92 extends transversely entirely across the open top of the wireway channel sections and it is suitably fastened to the channel members in any suitable or conventional manner as, for example, by hinge mountings of the type shown in the George U.S. Pat. No. 3,401,721. It is the usual practice to make the cover 92 in a plurality of sections that can be opened or removed individually for convenience in installing and servicing electrical wiring and its adjuncts. The cover sections may coincide in length with the channel sections on which they are mounted but this in not essential. A long channel section may have more than one cover section; and, in other situations, a channel cover section may extend over two or more channel sections.

The channel partition shown here also is made up of separate sections suitably joined together and detachably fastened to the channel body sections through which they extend. One partition section of the type shown at 94 (FIG. 6) is provided at each of the connecting members 62. More particularly, the partition section 94 is a flat platelike sheet metal member which is adapted to extend longitudinally of the channel body members with the lower edge thereof resting on or perhaps spaced slightly above the bottoms of the sections and the upper edge thereof extending substantially to but preferably spaced slightly below the top flanges of the sections (FIG. 4). The terminal end portions 96 and 98 of the partition section 94 are reversely bent in opposite directions, as shown in FIG. 6, and the reversely bent portions are spaced from and disposed in parallel relation to the main body of the partition section so as to receive and interfit with similarly bent ends of adjacent partition sections, as shown in FIG. 2. A mounting and attaching member 100 on the lower edge of the partition section 94 adjacent to one end of the latter is adapted to be inserted between the bottom of one or the other of two butted channel sections as, for example, the two sections 10 and 12 here shown and the bottom of the U-shaped connecting member 62 which joins the two sections together. The inner edge 102 of the attaching member 100 is formed with laterally spaced slots 104 and 106 which extend inwardly from the edge 102 and are adapted to receive one or the other of the bottom fastening screws 70 and 72.

In connection with the foregoing, it will be readily appreciated that any form of pinlike member can be used to fasten and locate the attaching member 100, but screws 70 and 72 qualify and are available for this purpose, and it is only logical to have them serve the double function and purpose of holding the channel members 10 and 12 attached to the connecting member 62 and also of holding and locating the partition section 94. In adapting the screws 70 and 72 for this purpose, it is desireable that they be disposed at the middle of the channel sections, that the slot 106 be disposed directly under the partition member 94, and that the other of the slots 104 be disposed substantially to the one side of the partition. By reason of the fact that the slot 106 is positioned directly under the partition section 94 it positions the partition section in the middle of the channel section when it is positioned to receive either one or the other of the bottom fastening screws 70 and 72. In this connection, attention is directed to FIG. 2 which shows the fastening screw 70 in the slot 106 and the partition member 94 positioned to bisect the channel members 10 and 12. In the particular form of the invention shown, the slots 104 and 106 are spaced sufficiently apart so that when the slot 104 receives one or the other of the fastening screws 70 and 72 the partition member 94 is disposed substantially one-third of the distance between the inner and outer sides of the channel members 10 and 12. For example, if the slot 104 is positioned to receive the fastening screw 72 which fastens the corner channel section 12 to the connecting member 62, the partition member 94 is disposed one-third the width of the channel member from the outer walls 16 and 50 (FIG. 8). By the same token, it will be readily appreciated that if the partition member 94 is moved laterally inwardly from the position shown in FIG. 2 with the slot 104 positioned to receive the fastening screw 70 which attaches the straight channel section 10 to the connecting member 62, the partition member will be positioned substantially one-third of the width of the channel from the inner walls 18 and 34 thereof (FIG. 7). Thus, by selectively positioning the attaching member 100 at one side or the other of the connecting member 62 and the slots 104 and 106 selectively in alignment with the fastening screws 70 and 72, the partition member 94 can be disposed either in the middle of the channel members or approximately one-third the distance from either the inner or outer sidewalls thereof.

The attaching member 100 of the partition section 94 can be attached to the main body portion of the partition section in any suitable manner; but, it preferably is formed integrally with the body of the partition section, as shown in FIG. 6. In this event, the partition 94 with the attaching member 100 thereon is stamped from a piece of sheet metal and the blank thus formed is shaped to produce the finished partition section by bending the attaching member 100 at right angles to the main body of the partition section and also bending the terminal end portions of the blank back upon themselves to form the reversely bent flanges 96 and 98. This operation spaces the lower edge 108 of the partition section 94 above the attaching portion 100 a distance approximately equal to the thickness of the connecting member 62 and the embossments 82. It also leaves a notch 110 in the lower edge 108 adjacent to the point of attachment 112 of the foot with the main body of the partition. This of course spaces the lower edge of the partition slightly above the bottoms of the channel sections 10 and 12 but the spacing is not sufficient to in any way adversely affect the ability of the partition to perform its intended function of dividing the wireway into separate inner and outer wire receiving compartments.

It will be readily understood that separate partition sections 94 are provided at each of the connecting members 62, as shown in FIG. 1. In the case of the straight channel sections 10, adjacent partition sections 94 are interconnected by straight partition sections 114; and, in the case of the corner sections 12, adjacent partition sections 94 are interconnected by L-shaped partition sections 116. The marginal end portions of the straight partition sections 114 are reversely bent in opposite directions and the reversely bent end flanges 118 and 120 thus formed are spaced laterally from and extend parallel to the main body of the partition so as to receive and interfit with adjacent end portions of the partition sections 94. In this connection, it will be observed also that the main body of the partition section 114 is offset laterally from the reversely bent ends thereof as required to position the main body of the partition substantially in line with the partition sections 94. Similarly, the marginal end portions of the partition sections 116 are reversely bent in opposite directions to provide reentrant flange portions 122 and 124 which extend in laterally spaced relation and parallel to the main body of the partition sections so as to receive and interfit with the reversely bent flanges of the adjacent partition sections 94. As in the case of the straight partition sections 114, the end portions of the corner partition sections 116 are offset laterally as required to position the main body portion thereof substantially in alignment with the adjacent partition sections.

From the foregoing, it will be readily apparent that the complete wireway can be readily assembled by connecting suitable straight and corner channel sections 10 and 12 together by means of connecting members 62, that the wireway assembly thus formed can be readily divided or partitioned either at the time of the original assembly or at any desired later time simply by attaching the partition sections 94 at each of the connecting members 62 and dropping in straight line and corner partition sections 114 and 116 as required to complete the partition assembly, and that the partition can be selectively positioned either at the middle of the wireway or relatively closer to either the inner or the outer sides thereof. It will be apparent also that different size straight and corner partition sections 114 and 116 may be required in the different adjusted positions of the attaching partition sections 94; however, the number of different parts required are relatively few and all of the parts are standard for any predetermined position of the attaching partition sections. It will be apparent also that if the partition is disposed at either the inner or the outer position; viz, relatively closer to either the inner wall or to the outer wall of the wireway, a second partition can be included which divides the wireway into three compartments of substantially equal width. Thus, the wireway can be adapted to contain two or three different electrical circuits that must or should be separated from each other; and, in the case of a two circuit arrangement for example, the wireway can be divided into two compartments of equal width or into two compartments one of which is relatively narrow and the other of which is relatively wide as required to best accommodate the physical bulk of the wiring harnesses. Further, when the cover sections 92 are opened or removed, the wiring can for the most part simply be placed in the wireway or into the wireway compartments through the open tops of the channel sections. It may be necessary in some instances to slide the wires or the wiring harnesses under the bridging straps 84 but it is not necessary under any circumstances to fish the wires or the harnesses endwise through the wireway or from one end of any wireway section to the other. In this connection, it is a further feature of the invention that the interfitting ends of the partition sections 94, 114 and 116 conceal all sharp edges and present only rounded or flat surfaces to wiring laying in or being pulled through the wireway channels or compartments, so there is little possibility of the partition ends wearing, abrading or in any way damaging the wires during installation or in use.

We claim:

1. Electrical wireway comprising
   a plurality of channel shaped wireway sections;
   connecting means joining adjacent wireway sections end-to-end and having portions thereof disposed in overlapping relation with respect to said sections;
   a plurality of removable partition sections dividing said wireway and said wireway sections into separate compartments, at least certain of said partition sections including
   attaching members having portions extending under and retained by the overlapping portions of said connecting means;
   fastening screws interconnecting the overlapping portions of said connecting means to said wireway sections, and said attaching members being formed with
   a plurality of laterally spaced, screw receiving slots which are selectively registerable with said fastening screws in different laterally adjusted positions of said partition sections and which cooperate with said fastening screws to hold the partition sections in selected adjusted positions.
2. The combination as set forth in claim 1 wherein
   said wireway sections are disposed in endwise butting engagement, and
   said connecting means are in the form of U-shaped connectors
   disposed in said wireway sections, said U-shaped connectors bridging the joint between the butted ends of said wireway sections and overlapping the adjacent marginal edge portions thereof, said fastening screws extending through the bottoms of said wireway sections and into the overlapping portions of said connectors, and
   the attaching members of said partition sections being in the form of laterally extending flanges on the lower edges of the partition sections,
   said flanges extending beyond the ends of the partition sections of which they are a part and said projecting portions adapted to extend under said U-shaped connectors with the screw receiving slots thereof in engagement with said fastening screws.
3. The combination as set forth in claim 1 wherein each of said attaching members is in the form of a flat platelike element disposed at right angles to the partition section of which it is a part, wherein,
   at least one of the screw receiving slots in said attaching member is disposed substantially directly under said partition section, and wherein
   said fastening screws are disposed at substantially the middle of said wireway sections,
   whereby positioning of said one slot in engagement with one of said fastening screws positions said partition section substantially in the middle of said wireway sections.
4. The combination as set forth in claim 4 wherein other of said screw receiving slots in said attaching member are disposed laterally of and away from said partition section and said one slot,
   said partition section being selectively positionable at either side of said connecting means with said other slot in engagement with a fastening screw,
   whereby to adjust the position of said partition section laterally in said wireway sections.
5. An electrical wireway comprising a plurality of channel shaped wireway sections arranged in end-to-end butting relation;
   connecting means joining said wireway sections to each other;
   fastening and locating means carried by said wireway sections adjacent to the ends thereof;
   a plurality of removable partitions sections dividing said wireway and said wireway sections longitudinally into separate compartments, at least certain of said partition sections including
   attaching members, said attaching members being interengageable with said fastening and locating means to hold said certain partition sections fastened securely to said wireway sections; said fastening and locating means being in the form of fastening screws and said attaching members being in the form of platelike mountings extending at right angles to and laterally of said certain partition sections, each of said platelike members having a plurality of laterally spaced slots opening through one edge thereof, each slot being selectively interengageable with one of said fastening screws to detachably fasten the certain partition member with which it is associated to one of said wireway sections, selective, individual, interengagement of said slots with said fastening screws being operative to dispose said partition section in different laterally adjusted positions in said wireway section.

6. The combination as set forth in claim 5 wherein one of said fastening screws is provided at each side of each connecting means, and wherein each of said certain partition members is adapted to be reversely positioned in said wireway with the platelike attaching member associated therewith in either of two adjacent ends of said wireway sections, and the slots in said platelike member being selectively interengageable with either of said fastening screws to dispose said certain partition section in different laterally adjusted positions in said wireway sections.

7. The combination as set forth in claim 6 wherein other of said partition sections are detachably interengageable with said certain partition sections in various laterally adjusted positions of the latter.

* * * * *

UNITED STATES PATENT OFFICE
CERTIFICATE OF CORRECTION

Patent No. 3,633,628      Dated January 11, 1972

Inventor(s) William F. Duquette, Dale T. Stormzand, Warren C. Rauhauser

It is certified that error appears in the above-identified patent and that said Letters Patent are hereby corrected as shown below:

Column 6, line 51     "4" should read --3--.

Signed and sealed this 6th day of June 1972.

(SEAL)
Attest:

EDWARD M. FLETCHER, JR.
Attesting Officer

ROBERT GOTTSCHALK
Commissioner of Patents